United States Patent [19]

Kime

[11] Patent Number: 5,045,676

[45] Date of Patent: Sep. 3, 1991

[54] OPTICAL MEDIA HAVING INTERLACED DATA RINGS

[76] Inventor: Milford B. Kime, 221 Mt. Auburn St., Cambridge, Mass. 02138

[21] Appl. No.: 168,643

[22] Filed: Mar. 15, 1988

Related U.S. Application Data

[63] Continuation-in-part of Ser. No. 130,065, Dec. 8, 1987, abandoned.

[51] Int. Cl.5 .............................................. G06K 19/00
[52] U.S. Cl. .................................... 235/487; 235/454; 369/93
[58] Field of Search ................... 235/454, 487; 369/93, 369/272, 264, 97; 360/2

[56] References Cited

U.S. PATENT DOCUMENTS

| | | | |
|---|---|---|---|
| 3,046,836 | 7/1962 | Schwartz et al. | 369/69 X |
| 3,337,694 | 8/1967 | Nakamatsu | 369/97 X |
| 3,432,168 | 3/1969 | Kingsbury . | |
| 3,501,586 | 3/1970 | Russell . | |
| 3,787,636 | 1/1974 | Brandt et al. | 179/100 |
| 4,066,460 | 1/1978 | Chang et al. | 96/48 |
| 4,090,031 | 5/1978 | Russell | 358/130 |
| 4,500,777 | 2/1985 | Drexler | 235/487 |
| 4,543,251 | 9/1985 | Kamishita | 424/81 |
| 4,592,042 | 5/1986 | Lemelson et al. | 360/2 X |
| 4,663,518 | 5/1987 | Borror et al. | 235/487 |

FOREIGN PATENT DOCUMENTS

| | | |
|---|---|---|
| 0230069 | 7/1987 | European Pat. Off. . |
| 61-190721 | 8/1986 | Japan . |
| WO8605620 | 9/1986 | World Int. Prop. O. . |

Primary Examiner—David L. Trafton

[57] ABSTRACT

There are disclosed improved optical information storage cards or tape which include on a substrate thereof a plurality of offset and interlacing data rings.

16 Claims, 5 Drawing Sheets

OPTICAL MEDIA HAVING INTERLACED DATA RINGS

CROSS REFERENCE TO RELATED APPLICATION

This application is a Continuation-In-Part of commonly assigned and copending application Ser. No. 130,065 entitled OPTICAL CARD HAVING INTERLACED RINGS filed Dec. 8, 1987 by Milford B. Kime, and now abandoned.

BACKGROUND OF THE INVENTION

This invention relates generally to optical information storage media, and, more particularly, to optical information storage media, such as cards, having increased storage capacity.

In the information society of today, need exists for storing and, of course, retrieving information in a manner which provides rapidity, low cost, reliability and which is condensed for economy of storage. It is expected that this need will be, in part, met by information storage cards such as bank, medical record, and the like which will have high-capacity data storage features and can, for example, be carried in a wallet.

With the relatively recent progress in optical recording techniques, for example, optically encoded and/or encodable media are preferred in many situations because they can store significantly higher amounts of information than, for example, correspondingly sized magnetic media. There are, however, accepted length, width and thickness standards for such cards. It therefore becomes desirable to increase the information storage capacity of such cards in a manner which does not increase its physical dimensions beyond such standards.

A wide variety of optical data cards already exist. One known type of card has information stored on laser recording media in the form of a stripe. Essentially, the information to be stored is converted to digital code and optically written as a series of micron-size spots or pits and spaces. These pits and spaces are recorded in generally linear tracks. A reader and/or writer device for use therewith must, therefore, perform rectilinear scanning movement with respect to these data tracks. While such an optical card reader and/or writer device uses space on the card satisfactorily, it nonetheless tends to be relatively complicated in construction and operation if high spot density is desirable. Also it is relatively costly to produce. However, in order to use less costly reading and/or writing hardware with such cards, then a compromise with respect to storage capacity is required since larger spot sizes are needed. A low capacity card of this type is described in U.S. Pat. No. 4,500,777.

Another kind of optical record card is described in U.S. Pat. No. 3,501,586, wherein data is recorded onto data tracks which are segmented into arc like raster lines across the surface of the card. Such cards may be read by a playback system, such as illustrated in U.S. Pat. No. 4,090,031, wherein the card is held stationary and each track segment can be read by a corresponding set of scanning elements. While such an optical card and associated hardware serve satisfactorily, they nonetheless tend to have some shortcomings. For instance, the arcuate tracks on the card are interrupted at the card edges. Thus, either the hardware becomes complex by requiring multiple objectives or the data stream is interrupted. Also, tracking and focusing are also relatively more complex than with rectilinear scanning. Significantly, the card surface area of this type card is less well utilized than with the above noted cards using a rectilinear approach because the bow shaped space the data occupies wastes areas at each end of the card.

Still another known approach to putting information on a card is one which has an annular track portion that can be read and/or written on while the card or writing head is rotated about a rotational axis of the card. Examples of this type of card are disclosed in U.S. Pat. No. 3,787,636 and Japanese Patent No. 61-190721. The latter patent describes an optical card utilizing an annular area of an optical recording medium. This card tends, however, not to be as efficient in utilizing card space since it is limited by a single annular band. Even in the situation where the end areas of the card are utilized by arcuate or curvilinear segments outside the noted annular band, such arcuate segments present signficiant focusing and tracking problems insofar as an optical head has to go off the card to read corresponding tracks at both ends of the card. In addition, the hub area cannot be utilized effectively without excessive rotational speed.

The noted disadvantages and shortcomings of the prior art optical storage cards are reduced substantially by reason of the present invention.

SUMMARY OF THE INVENTION

In accordance with this invention there is provided an information storage medium which may be embodied in the form of a card or tape having increased storage capacity for a predetermined length.

In accordance with this invention, an information storage card is provided having a generally rectangular format. Included on at least one surface thereof is a plurality of generally annular, offset and interlacing data bands of an information recording medium. Each of the information recording data bands has a separate axis of rotation about which the card and the corresponding data band can be relatively rotated about with respect to a reader and/or a written so that information on the one data band can be read and/or written on without hinderance from the other band.

In an illustrated embodiment the information recording medium is of the type which can be optically read and/or written on. In this embodiment the optical medium is formed integrally in the card.

In one illustrated embodiment, the interlacing data bands are arranged so that at least one is reserved for exclusive and continuous use through intersecting areas of the interlacing bands. Accordingly, the other band is segmented through the intersecting areas of the bands.

In another illustrated embodiment, both of the interlacing data bands are segmented through respective intersecting areas of the data bands.

In another illustrated embodiment, each of the data bands is formed integrally with the card structure so that data tracks in each of the bands are continuous and intersect in the intersecting areas.

In another illustrated embodiment, each of the bands is formed integrally in the card structure so that data tracks in each of the bands is formed in a series of spaced discontinuous portions in the intersecting areas. The discontinuous portions form a checkerboard like arrangement of discontinuous portions of said bands in the intersecting areas.

In another embodiment, there is provided an information storage tape instead of an information storage card. The tape would be like the card described above in terms of carrying a plurality of interlaced data bands, but would be constructed so as to allow the tape to be wrapped on and unwrapped from a spool or the like and be linearly advanced in a generally planar configuration between rotating spools.

Among the objects of this invention are therefore, the provision of an improved information storage card or tape which enhances significantly the storage capacity of the card or tape; the provision of an improved information storage card which enhances significantly the storage capacity of the card while permitting the card to be rotated for reading and/or writing purposes; the provision of an optical data card or tape which has a plurality of annular data bands arranged in an offset and interlacing relationship with respect to each other; the provision of an optical data card or tape of the last type wherein each of the annuli has a rotational axis about which the card or tape and annuli can be respectively relatively rotated about in order to permit reading and/or writing on the respective annuli; the provision of an optical data card having a pair of interlacing bands of the types noted, whereby the amount of information storable is increased significantly while facilitating the maintaining of standard sizes for such cards; the provision of an optical data card or tape wherein reading and/or writing of information on one band is done without hinderance from the other band; and, the provision of an optical data card which utilizes reliable and inexpensive rotary optical reading and/or writing hardware.

These and other objects, features and the invention itself will become apparent from the following description when taken in conjunction with the accompanying drawings wherein like structure throughout the several views are indicated by like reference numerals.

DETAILED DESCRIPTION

Reference is made to FIGS. 1-9 for showing several novel and improved versions of an optical information storage card made in accordance with the present invention. As will be explained presently, these cards provide users with significant storage capacity, yet can be optically read and/or written on by low cost optical disc kinds of readers and/or writers of the type which rotate the medium for reading and writing purposes. The foregoing can be done without necessitating an increase in the size of such cards relative to standard sizes used for these cards because of the interlacing of data rings. For example, with the wallet size cards contemplated for purposes of medical or bank records, it is possible, according to this invention, to increase information storage signficantly within the dimensions normally associated with wallet size cards. These cards can have rectangular configurations which have, for instance, dimensions of about 86 mm long and 54 mm wide. Of course, other suitable sizes (e.g. 82 mm long and 59 mm wide) and configurations are envisoned.

Figure 1:
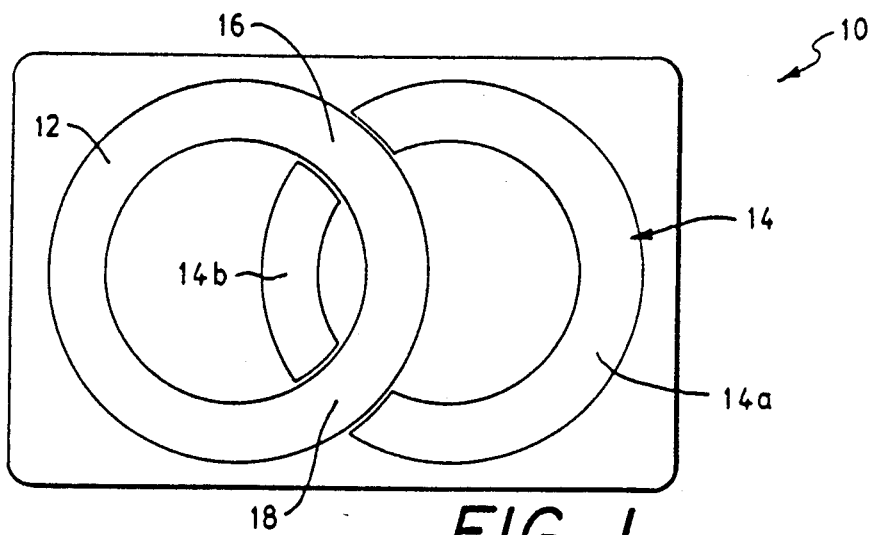
FIG. 1 is a planar view of one preferred embodiment of an optical data card made according to the principles of the present invention.

Initial reference is now made to FIG. 1 which depicts an embodiment of an optical information storage card 10. Provided on at least one surface of the information storage card 10 is a pair of offset data bands or rings 12, 14, respectively. The data rings 12, 14 are juxtaposed in an interlacing relationship as shown. Interlacing results in two intersecting zones 16, 18, the features of which will be described subsequently. The data rings 12, 14 are preferably made of an optical write-once medium which facilitates, of course, optical reading and writing. Besides, a write-once medium, the present invention also contemplates use of a read only medium and even an erasable medium. The data rings 12, 14 can be encoded with digital or analog machine readable information subsequent to issuance of the card. While a single surface is discussed as having the noted interlacing data rings 12, 14, it will be understood that the other side of the card 10 may also be provided with at least a pair of interlacing data rings. More than one pair may also be employed per side.

Figure 4:
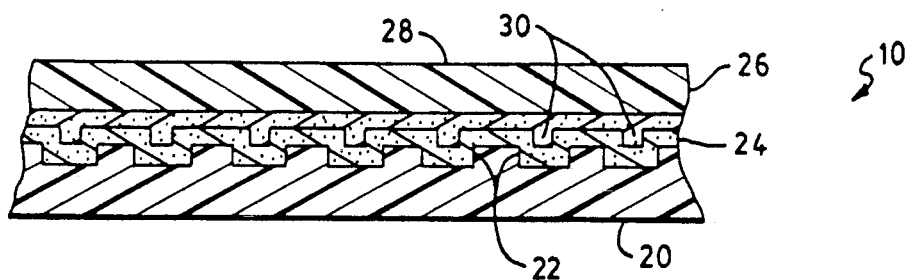
FIG. 4 is a cross-sectional view of a laminar structure of a card according to this invention.

Reference is made to FIG. 4 which illustrates an enlarged and fragmented cross-sectional view of a simple laminar structure of an optical write-once card 10.

Details as to the structure of the card 10 and the manner of making the card structure do not, per se, form an aspect of the present invention. For a more complete understanding of the above considerations, however, reference is made to commonly assigned and copending application Ser. No. 103,745 filed Oct. 1, 1987 now U.S. Pat. No. 4,831,244. Accordingly, only those details of the construction of a similar card described in the noted application, which are necessary for understanding the present invention, will be set forth.

The card 10 includes a substrate 20, an information surface 22, reflection layer 24, a layer 26 of an optically encodable write-once medium, and a protection layer 28. At the outset, it should be noted that the card structure could take on a variety of constructions and materials and is not limited to the materials mentioned below.

In this embodiment, a variety of materials can be used for the substrate 20 and these include embossable materials like polycarbonate; polyesters like polyethylene terephthalate; polypropylene; polystyrene; vinyl; acrylic; cellulose acetate butyrate; thin metals such as aluminum; and electron beam and ultraviolet curable polymers and epoxy-type polymers. The foregoing recitation of embossable materials is intended to be in no way limiting to the kinds of embossable materials which may be used.

The thickness of the card 10 is in the order of about 30 mils. This is preferred for total thickness of wallet size credit cards. Hence, the respective thickness of the layers forming the card 10 should, in total, be approximately equal to such a desired thickness. In this embodiment, the thickness of the substrate 20 is about 3.5 mils and is made of a polycarbonate material, such as LEXAN which is manufactured by General Electric.

The substrate 20 can have formed thereon preformed tracking paths or grooves 30 in concentric and/or spiral formats. Data may be embossed in the tracking paths or grooves 30 in the form of lands and pits (not shown). The lands and pits and the tracking grooves provide the machine readable information surface 22. It will be understood that the write-once layer 26 also overlies the tracking paths or grooves 30. Thus, the tracking paths or grooves 30 can provide not only tracking information, but also contain read only lands and pits and adjacent thereto the write-once layer 26. The information surface 22 is optically readable by a laser type optical system that reads changes in optical phase or transmission between such lands and pits and grooves. For purposes of illustration, the tracking grooves 30 or pits can range in depth from about 0.05 microns to 0.15 microns. Preferably, however, the tracking grooves 30 or pits having an average depth of 0.10 microns can be used. Pit lengths are from about 0.6 microns to 10 microns. Widths of the grooves 30 or pits from about 0.4 microns to 1.5 microns are typical.

Embossing of the information surface 22 is accomplished by embossing the substrate 20 while the latter is part of a web, with a master die having a pattern with a relief structure which is the negative of that of the embossed information surface 22. Details of the embossing technique, per se, do not form part of this invention. Reference is, however, made to U.S. Pat. No. 4,543,251, for describing a web embossing technqiue which can be used in the formation of the information surface 22 on the substrate 20. This invention contemplates other web embossing techniques or other known techniques for forming such depressions, such as injection molding or casting. The grooves 30 are arranged in concentric and/or spiral fashion in the form of the data rings 12, 14 which are interlaced with respect to each other. The information surface 22 in respective ones of the data rings 12, 14 is arranged so as to be sectored. Sectoring is a known technique done so that the data annuli are compatible with conventional rotating write-once optical disc drive systems, such as the IBM 3363 system. Typically, with such a drive system there are about twenty-three sectors (not shown) on a complete annulus. The size and arrangement of the tracking grooves 30 and/or lands and pits which form the annuli 12, 14 for use with such a disc drive system are known. Covering the information surface is a reflection layer 24 which can have a thickness in the order as noted in said last noted application. The reflection layer 24 overlies the embossed information relief surface 22 which includes pretracked spiral and/or concentric grooves. The reflection layer 24 can be made of material, such as aluminum and be applied by vacuum deposition subsequent to the embossing step. The reflection layer 24 should have a thickness capable of achieving the reflecting function and should also provide for the specular reflection necessary for the optical head to maintain tracking and focus.

As shown in the drawing, overlying the grooves 30 is the layer 26 of an optically encodable write-once medium. The write-once medium layer 26 is a dye forming layer as described in commonly assigned U.S. Pat. No. 4,663,518, or it can be tellurium-based materials of the kind described in U.S. Pat. No. 4,066,460. The latter material undergoes a physical phase change when subjected to imaging energy to produce a material of different crystaline character or composition having at least one detectable optical characteristic which differs from the characteristics of the starting material. The thicknesses of the write-once layer and the manner of making it are described in the last noted patent.

The writable layer 26 is suitably applied to the layer 24 by conventional chemical coating techniques. The layer 26 and the relief surface 22 have concentric and/or spiral groove formats to facilitate reading by rotation of the substrate. Covering the writable layer 26 is a protection layer 28 which is suitably secured to the former by known techniques. The reflection layer 24, the embossed information substrate 20 and the protection layer 28 are made of the materials and in the range of thicknesses as their corresponding layers described in the last noted application for an optical write-once card made with such a physical structure. Having described certain features and characteristics of the structure of the card 10 as well as the grooves 30 reference is now made to the interrelationship of the data annuli or rings 12, 14.

FIG. 1 shows the card 10 wherein the data ring 12 has its grooves (not shown) arranged in a continuous format. Hence, the data rings 12 can be written and/or read continuously. The grooves have, therefore, full exclusionary paths running through the intersecting zones 16, 18. Thus, there is no difficulty with the optical head holding focus and positioning as it tracks through the intersecting zones 16, 18. The data ring 12 is arranged to have a width which is equal generally to at least one of the sectors on ring 14. Hence, the data ring 14 is interrupted physically twice by the data rings 12. This reduces the capacity of data storable on the data ring 14. However, such reduction is minimized to only two sectors of the ring 14 that would normally be available. This is approximately equal to about a loss of only about 9 percent of the information that would be otherwise storable on the data ring 14. Clearly, the interlacing relationship almost doubles the amount of the information which is storable on the card 10 when using data rings. This is done without the necessity of increasing the dimension of the card 10.

With respect to the data ring 14, each of the annular set of grooves, as noted, is disrupted twice by the data ring 12. The optical head will be able to maintain proper focusing and must reacquire tracking. The focusing function is relatively easily maintained since the information surface 22 of the data ring segments 14a, b are generally coplanar by reason of being integrally formed in the same surface of the card 10. Accordingly, the grooves tend to be at the same focus depth and it is, therefore, easier for the optical head to hold focus depth, and reacquire track. Each of the grooves in the data ring segments 14a, b have suitable clocking information and write protect headers prerecorded therein as by embossing, to cause suppression of the reading and/or writing and tracking functions by the optical head for the time interval the optical head traverses the width of the data ring 12. Following head write suppression for a preselected time period, the optical head is operative to reacquire the particular groove it had been tracking in the data ring 14. This pattern is repeated as the optical head traverses or flies over the intersecting zones. It should be noted that in situations such as this, the bandwidth of the tracking signal of the optical head is limited so that there is less of a tendency for the head to seek another track as it goes through the intersecting zones.

Figure 2:
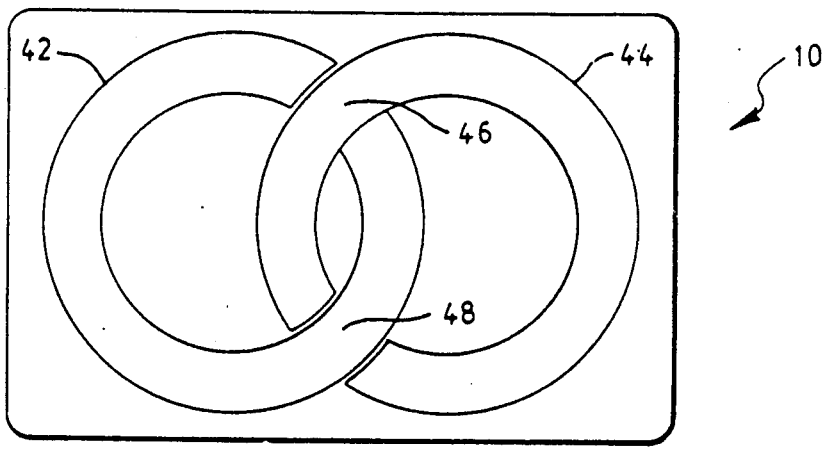
FIG. 2 is a planar view of a second preferred embodiment of an optical data card of the present invention.

Reference is made to the embodiment shown in FIG. 2, wherein an optical card 40 is constructed similarly as the one of the previous embodiment. The major difference being the fact that neither one of the data rings 42, 44 has full exclusionary paths. Consequently, the grooves and/or pits (not shown), similar to grooves and/or pits of the last embodiment, in each of the rings 42, 44 are dimensioned and spaced apart as described in the last noted embodiment. Accordingly, each of the data rings 42, 44 intersect respectively at intersecting zones 46, 48. Thus, the optical head tracking will be suppressed as it flies over the zones 46, 48. The capacity of information storable on the data rings 42, 44 is the same as that for the data rings 12, 14.

Figure 3:
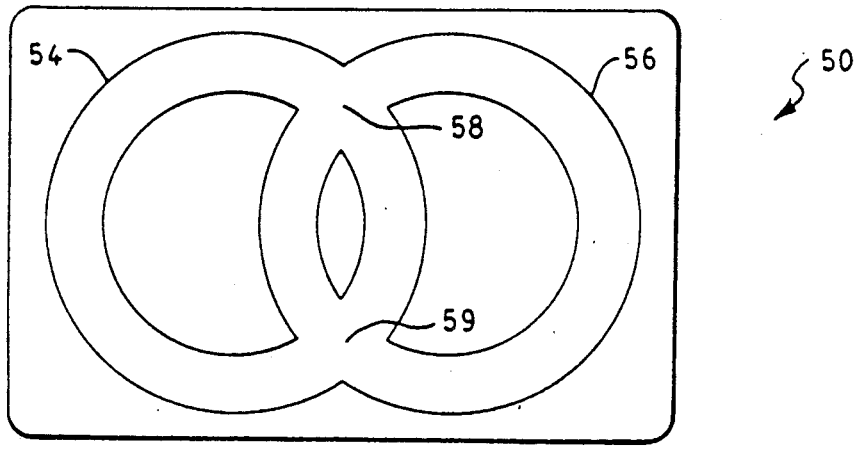
FIG. 3 is a planar view of yet another preferred embodiment of an optical data card of the present invention.
Figure 5:
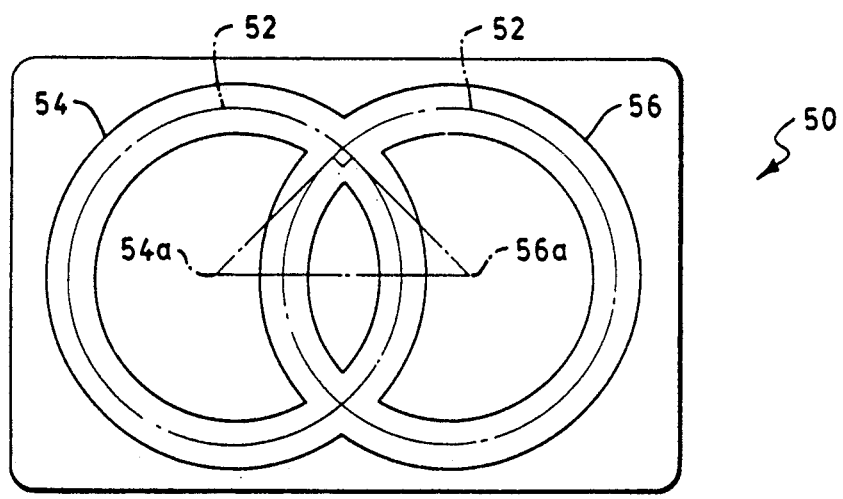
FIG. 5 is a planar view showing a geometrical relationship between offset data annuli on such a card.
Figure 7:
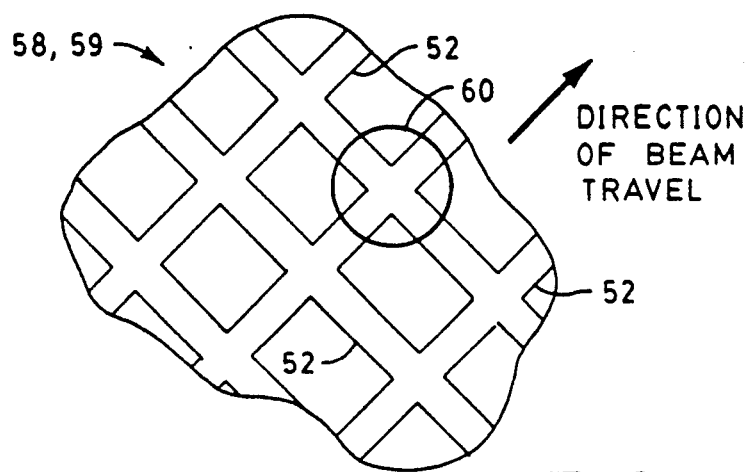
FIG. 7 illustrates another preferred embodiment wherein grooves of respective data bands are arranged in an intersecting relationship;, FIG. 8 a planar view of a card made according to this invention mounted on a rotatable tray.

Reference is now made to FIGS. 3, 5 and 7 for showing another embodiment of an optical card 50. The card 50 is constructed similarly as the cards in the previous embodiments. One significant difference is however, that the paths or grooves 52 (FIG. 7) in the data annuli or rings 54, 56 intersect in the intersecting zones 58, 59. For this arrangement to operate successfully, there are several factors which inhibit the head from losing position tracking on either one of the annuli 54, 56. The width of the grooves 52 is narrow, for example in the order of about 0.5 to 0.8 microns and the spacing between them in the order of about 1.6 microns. Another is the fact that the width of the respective data rings 54, 56 and their respective distances apart affects the angle of intersection of each of the intersecting grooves 52.

It has been determined that the grooves 52 in the respective data rings 54, 56 should intersect at about 90° (FIG. 5). With such an intersection angle, there is less tendency for an optical head losing track on one groove and attempting to track grooves in the other data ring. This intersecting angle is preferably 90°, but can range, from about 40° to 140° degrees and still facilitate adequate tracking through the intersecting zones. In this regard, the desire for general perpendicularity constrains the size of the respective data rings 54, 56 and their spacing with respect to each other. Reference is made to FIG. 5, wherein the rotational centers 54a, 56a of respective data rings 54, 56 are spaced apart from each other by a distance equal to approximately 1.414 R so that the angle of intersection is about 90°; wherein R is the radius of the median groove 52 of each ring with respect to the rotational center thereof. Of course, these geometrical arrangements change as the angle of intersection changes. Also, the width of the data rings 54, 56 is selected so as to insure that the angle of groove intersection is within the noted 40° to 140° range throughout the width.

With narrow grooves having dimensions of the order as noted above, it is easier for a head servo-system, especially of the push-pull type to be effective in maintaining tracking. This is due to the fact that with narrow grooves a wide illuminating beam 60 (FIG. 7) from the head does not result in significant alterations in the tracking signal on the areas of groove intersection. The beam generally has a diameter about three times the width of the groove. The grooves 52 can also, if desired, be formed with clocking formations to assist in servo control. It will be appreciated that if, for example, there is a speck of dust on the card surface or a scratch, the head will lose some of its tracking signal. Thus in a like manner, a possibility for mistracking is created in the areas of groove intersection since there is the possibility of the head picking up a portion of the signal from an intersecting one of the grooves. However, this tendency is reduced by reason of the narrow grooves, the general perpendicularity of the intersecting grooves and the fact that the flat area surrounding the groove being tracked is relatively large. In other words, even though the beam 60 intersects both grooves of respectively different data bands 54, 56, the signal from the groove which is not to be followed will most probably not be significant enough to cause a tracking error. Also, this tendency for mistracking is reduced because the bandwidth of the servo system is changed when crossing a groove so as to slow its response time, thereby inhibiting the head from losing its track. In this kind of tracking arrangement, writing by the optical head is suppressed while tracking functions continue in the intersecting areas.

Figure 6:
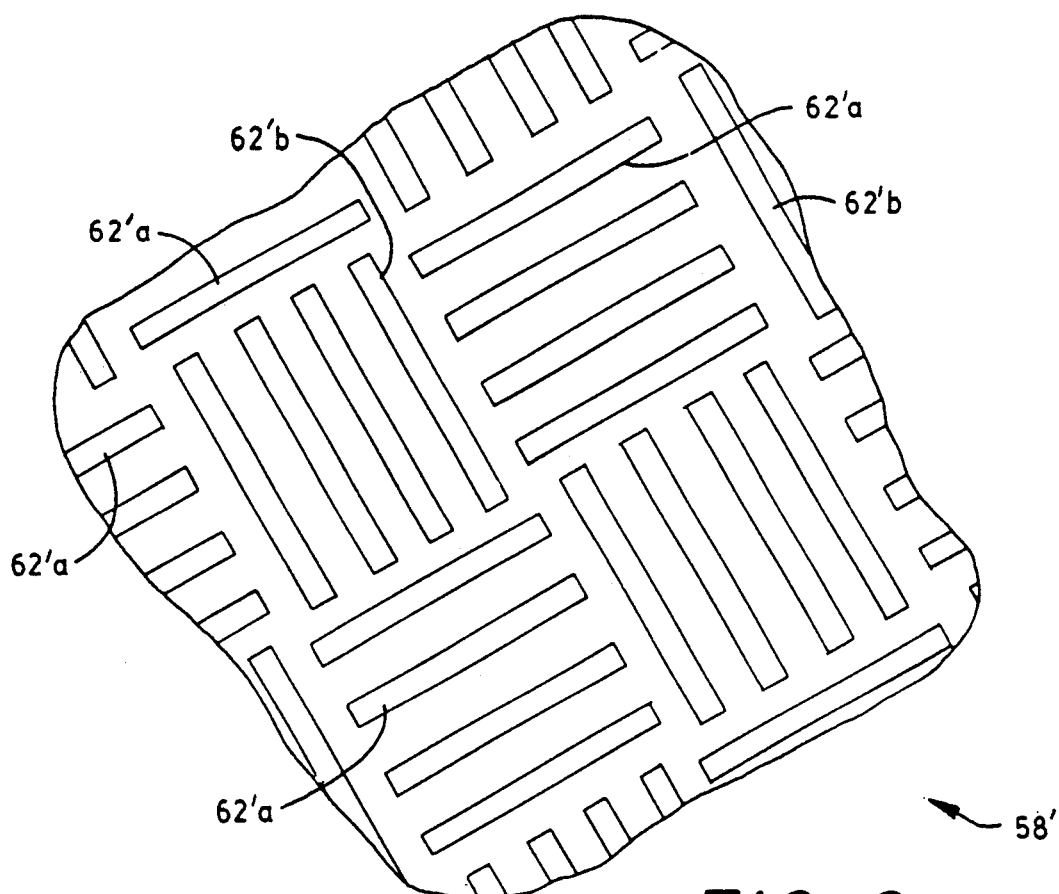
FIG. 6 illustrates a preferred embodiment wherein grooves of respective optical data bands are arranged in a checkerboard fashion.
Figure 8:
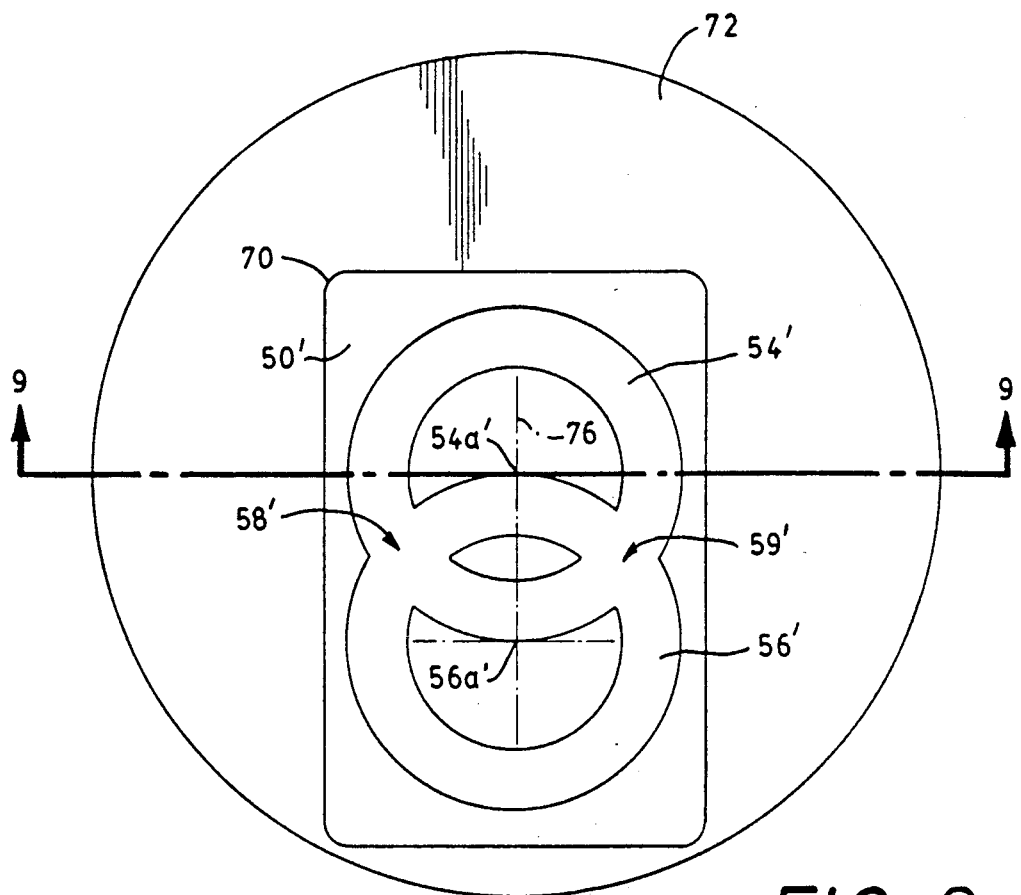

Reference is now made to FIGS. 6 and 8 for showing another embodiment of the card 50' wherein grooves of respective data rings 54' 56' in the intersecting areas 58' 59' are arranged in a checkerboard fashion. In this manner, the construction of the card 50' with the data rings 54' and 56' are the same as the other embodiments, except none of the grooves are continuous throughout the intersecting area or zones 58', 59'. Rather adjacent groups of grooves 62'a, 62'b intersect in the checkerboard fashion shown in FIG. 6. As seen, the plurality of adjacent groups of alternating grooves 62'a, 62'b of each of the data rings intersect each other at about right angles. The width of the grooves 62'a, 62'b, in this embodiment can be about in the same range as described in the last embodiment and the spacing between adjacent grooves can be about the same. Moreover, the length of the groove segments is in the order of about a few microns to 1 mm. The optical head will suppress the writing of information in the zones where the beam is crossing tracks while permitting focus to be maintained. Towards the latter end, each groove of the group of grooves 62'a, 62'b is formed with clocking information which will facilitate signaling the head to cease operating for the time duration the head flies over a group of grooves which extend in a direction transverse to the direction of intended relative movement of the head. The checkerboard approach is preferred over the intersecting approach of the last embodiment because data can be recorded at about 50% of the normal rate even in the intersecting areas of the rings.

Figure 9:
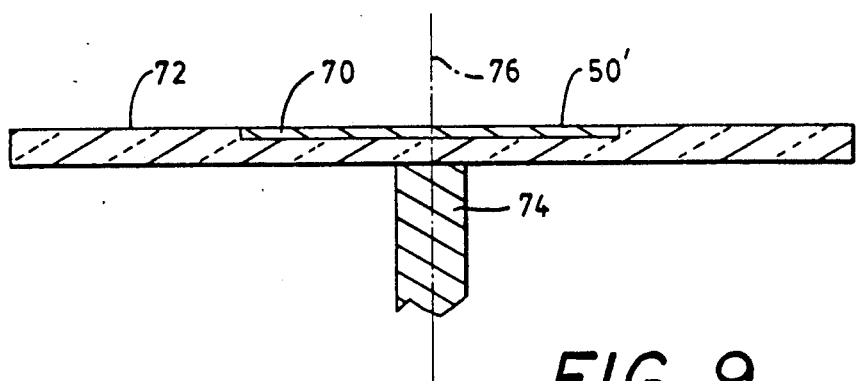
FIG. 9 is a cross-sectional view taken along section line 9—9 apppearing in FIG. 8 and looking in the direction of the arrows.

In FIGS. 8 and 9, there is shown one approach for rotating the cards. This includes advancing a card into a rectangular recess 70 formed in a rotatable tray 72 that is suitably coupled to a spindle 74 of an optical reader and/or writer device (not shown). The recess 70 is formed so that when a card is received therein, one of the two rotational centers of the data bands will coincide with a rotational axis 76 of the tray. Since the card is flexible and planarity of the data rings is desired for reading and/or writing, a clamp (not shown) can be used for pressing downwardly on the top side of the card. The data rings face downwardly and the tray is optically transparent to the electromagnetic wavelengths being used for optical reading and/or writing. It will be recognized that the data rings are separately read and/or written on by placing the suitable one of the data rings on the tray 72 so that its respective center of rotation will coincide with that of the spindle.

The present invention contemplates that the data rings need not be formed integrally with the card. For example, the data rings could be preformed and adhered to a card surface. But with adhered data rings, it will be understood that the kinds of data rings with the intersecting and checkerboard grooves in the intersecting zones could not be achieved easily. It will be understood further that while grooved optical media has been described, the present invention contemplates use of other tracking techniques and other recording media in annular form, such as magnetic media. With other media, the data ring formats would be similar to those described in the first two embodiments.

Figure 10:
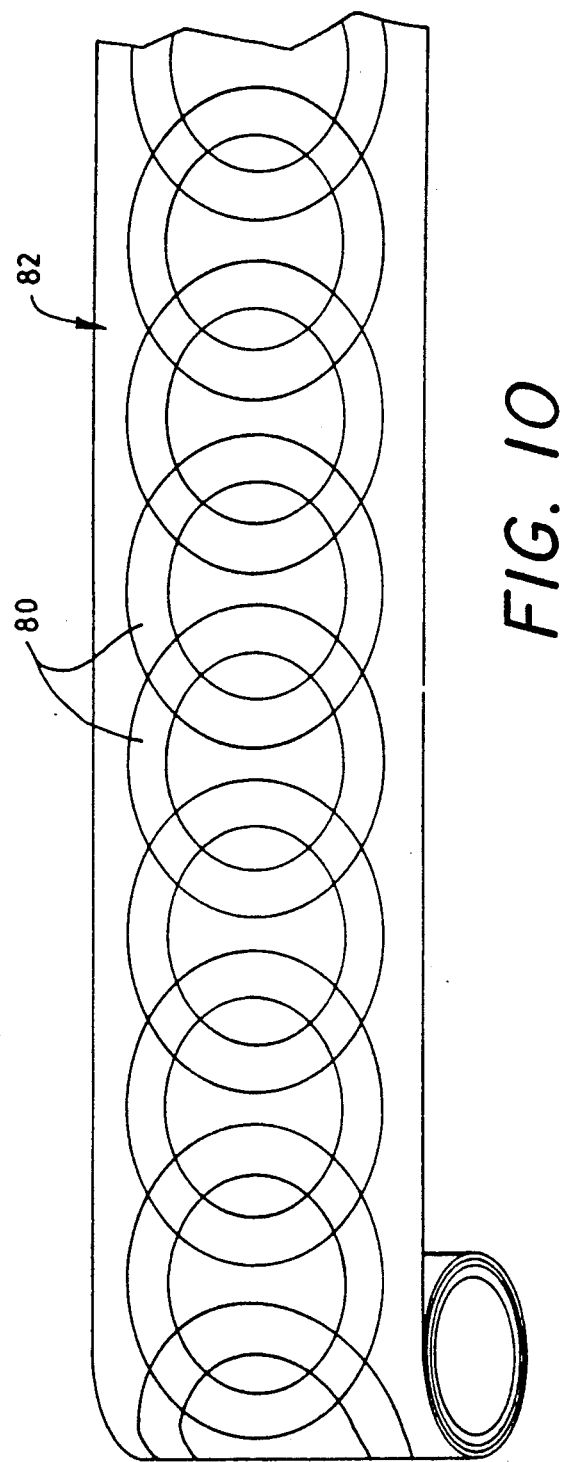
FIG. 10 is a perspective view of another embodiment showing a tape having a plurality of interlaced data bands thereon.

FIG. 10 depicts another preferred embodiment of the present invention. While the preceeding embodiments relate to the use of interlaced rings on information storage cards, this embodiment shows a plurality of interlaced data bands 80 being arranged in juxtaposed interlacing relationship on a thin web-like structure or tape 82.

In terms of the tape 82 construction, it is similar to the write-once optical card of the previously described embodiment with, however, the exception that a thin, flexible and transparent protective layer (not shown) is used instead of the relatively thick protective layer 28 described above. Although such a write-once construction is used in this embodiment, the data bands 80 of course can be a read only optical type or erasable optical type as well. In this embodiment, the thin transparent protective layer could be made of a thin lacquer or thin UV protector and have a thickness range in the order of about 0.1 mils to 1 mils. The techniques for applying such a protective layer are well known and do not form part of this invention. Although the tape 82 of this embodiment is to be read in the reflection mode, it will be understood that it can be read in the transmission mode provided, of course the reflective layer is not utilized.

The thickness of the substrate in the tape 82 can vary, but in this embodiment, it is in the order of 0.5 to about 3 mils and is made of the same polycarbonate material as described for the substrate 20 in the previous embodiments (e.g. LEXAN).

The thickness range of the tape 82 should be such as to facilitate the tape 82 being easily wrapped about and advanced by driving spools or the like in a generally planar configuration. For instance, the thickness can be in the range of 0.5 mils to 3.5 mils.

Reference is made to the above-noted web embossing technique which is usable in forming the data bands 80 on the substrate tape 82. Accordingly, a detailed description of such a technique is not believed necessary for understanding this embodiment. The data bands 80 can have formed in the tape 82 preformed tracking paths or grooves (not shown) in concentric and/or spiral formats as described in the previous embodiments. Data may be embossed in the tracking paths or grooves in the form of lands and pits (not shown). The lands and pits and the tracking grooves provide the machine readable information surface of the data bands 80 and can have the same size parameters as the embodiments noted previously.

The data bands 80 can have interesection zones as described in the previously noted embodiments. Likewise, the size and geometrical relationships of the data bands 80 can follow those as set forth regarding the earlier described embodiments. The data bands 80 can have a variety of sizes. It shoud be noted, however, that the centers of each data band 80 should be free of any information. In other words, a data band 80 should not encompass the geometrical center of adjacent data bands.

It will be appreciated that according to this embodiment, there is thus provided a very thin tape 82 having flexible characteristics which allow it to be pulled taught so that the data bands 80 are maintainable in a planar configuration and have sufficient beam strength to allow it to be advanced in a planar condition. It will be appreciated that this invention envisions that the tape 82 can be die cut to include several data bands on a tape strip of predetermined length. While this embodiment teaches that the data bands are made of optical media formed integrally in the substrate, the invention is not limited thereto. For instance, the data bands could be adhered to the substrate and also need not be made of optical media but can include magnetic media as well.

The present invention may be embodied in other specific forms without departing from the spirit or essential characteristics thereof. The present invention, is, therefore, to be considered in all respects as illustrative and not restrictive. The scope of the invention being indicated by the appended claims rather than by the foregoing description and all changes which come within the meaning and the range of equivalency of the claims are therefore intended to be embraced therein.

What is claimed is:

1. An optical information storage card of the type that can be read and/or written on by an optical reader and/or writer by way of an optical beam, the reader and/or writer being of the type configured for servo tracking, said card comprising:
   a substrate having a generally rectangular format and;
   a plurality of generally annular, axially offset and interlacing data bands, comprising a continuous spiral track or a plurality of concentric tracks, of an optical recording medium on a surface of said substrate, said recording medium being of a type which can be optically read and/or written on;
   each of said bands being arranged and having a corresponding axis of rotation about which said card can be relatively rotated with respect to an optical reader and/or writer device, and each of said bands being formatted with prerecorded data sector and servo tracking information, so that information of each of said data bands can be read and/or written on without hinderance from any other band in areas where the paths of such bands intersect while facilitating maintenance of servo tracking.

2. The card of claim 1 wherein:
   at least one of said bands is arranged for exclusive and continuous use through intersecting areas of said interlacing bands and another of said bands is segmented through said intersecting areas of said one band.

3. The optical card of claim 1 wherein:
   each of said bands comprises a plurality of substantially concentric or spiral tracking paths which are continuous and intersect in said intersecting areas, each of said tracking paths having a relatively narrow width in relationship to the width of the optical read beam of the optical reader, such that there is substantially no tendency for the beam to seek another track path for tracking paths of said other band intersecting with the read beam.

4. The optical card of claim 3 wherein:
the width of each of said tracking oaths is in the order of about 0.5 to 0.8 microns, and the spacing between adjacent ones of said tracks is wide enough to permit uninterrupted passage of the read beam.

5. The optical card of claim 4 wherein:
said intersecting tracking paths intersect at an angle in the range of from about 40 to 140 degrees.

6. The optical card of claim 1 wherein:
each of said bands comprises a plurality of substantially concentric or spiral tracking oaths which are formed in a series of spaced discontinuous portions in said intersecting areas, select groups of spaced parallel discontinuous portions in one of said bands alternating with select groups of spaced parallel discontinuous portions in another of said bands to form a checkerboard like arrangement of groups of discontinuous portions in said intersecting areas, whereby the optical read beam tracking on one of said paths is active when the beam traverses over said spaced discontinuous portions of said one path and inactive over said spaced discontinuous portions of another of said paths.

7. The optical card of claim 6 wherein:
the width of each of said tracking paths is in the order of about 0.5 to 0.8 microns, and the spacing between adjacent ones of said paths is wide enough to permit uninterrupted passage of the read beam, and the length of said segments is in the order of about several microns to 1 mm.

8. The optical card of claim 7 wherein:
said discontinuous portions of the paths of one of said bands intersects said discontinuous portions of the paths of another one of said bands at an angle in the range of from about 40 to 140 degrees.

9. An optical information storage tape of the type that can be read and/or written on by an optical reader and/or writer by way of an optical beam, the reader and/or writer being of the type configured for servo tracking, said card comprising:
a thin, flexible web-like substrate being able to be wrapped and unwrapped from spools and advanced in a generally planar configurations; and,
a plurality of generally annular, axially offset and interlacing data bands, comprising a continuous spiral track or a plurality of concentric tracks, of an optical recording medium on a surface of said substrate, said recording medium being of a type which can be optically read and/or written on;
each of said bands being arranged and having a corresponding axis of rotation about which said card can be relatively rotated with respect to an optical reader and/or writer device, and each of said bands being formatted with prerecorded data sector and servo tracking information, so that information of each of said data bands can be read and/or written on without hinderance from any other band in areas where the paths of such bands intersect while facilitating maintenance of servo tracking.

10. The tape of claim 9 wherein:
at least one of said bands is arranged for exclusive and continuous use through intersecting areas of said interlacing bands and another of said bands is segmented through said intersecting areas of said one band.

11. The optical tape of claim 9 wherein:
each of said bands comprises a plurality of substantially concentric or spiral tracking paths which are continuous and intersect in said intersecting areas, each of said tracking paths having a relatively narrow width in relationship to the width of the optical read beam of the optical reader, such that there is substantially no tendency for the beam to seek another track path or tracking paths of said other band intersecting with the read beam.

12. The optical tape of claim 11 wherein:
the width of each of said tracking paths is in the order of about 0.5 to 0.8 microns, and the spacing between adjacent ones of said tracks is wide enough to permit uninterrupted passage of the read beam.

13. The optical tape of claim 12 wherein:
said intersecting tracking paths intersect at an angle in the range of from about 40 to 140 degrees.

14. The optical tape of claim 9 wherein:
each of said bands comprises a plurality of substantially concentric or spiral tracking oaths which are formed in a series of spaced discontinuous portions in said intersecting areas, select groups of spaced parallel discontinuous portions in one of said bands alternating with select groups of spaced parallel discontinuous portions in another of said bands to form a checkerboard like arrangement of groups of discontinuous portions in said intersecting areas, whereby the optical read beam tracking on one of said paths is active when the beam traverses over said spaced discontinuous portions of said one path and inactive over said spaced discontinuous portions of another of said paths.

15. The optical tape of claim 14 wherein:
the width of each of said tracking paths is in the order of about 0.5 to 0.8 microns, and the spacing between adjacent ones of said paths is wide enough to permit uninterrupted passage of the read beam, and the length of said segments is in the order of about several microns to 1 mm.

16. The optical tape of claim 15 wherein:
said discontinuous portions of the paths of one of said bands intersects said discontinuous portions of the paths of another one of said bands at an angle in the range of from about 40 to 140 degrees.

* * * * *